United States Patent [19]

Moriya et al.

[11] Patent Number: 4,692,915
[45] Date of Patent: Sep. 8, 1987

[54] RECORDING AND REPRODUCTION APPARATUS HAVING IMPROVED RELIABILITY WITH RESPECT TO EXTERNALLY APPLIED VIBRATION OR IMPACT

[75] Inventors: Mitsuro Moriya, Neyagawa; Kazuharu Shiragami; Hiroyuki Yamaguchi, both of Hirakata, all of Japan

[73] Assignee: Matsushita Electric Industrial Co., Ltd., Kadoma, Japan

[21] Appl. No.: 738,464

[22] Filed: May 28, 1985

[30] Foreign Application Priority Data

Jun. 15, 1984 [JP] Japan .................................. 59-123000

[51] Int. Cl.[4] ............................................. G11B 27/36
[52] U.S. Cl. .......................................... 369/53; 369/58
[58] Field of Search ..................... 360/31, 71, 75, 105, 360/107, 109, 69; 358/342; 369/44-46, 53, 54, 58, 247, 263, 43

[56] References Cited

U.S. PATENT DOCUMENTS

| | | | |
|---|---|---|---|
| 4,040,103 | 8/1977 | White | 360/75 |
| 4,138,121 | 2/1979 | Nakajima et al. | 369/247 |
| 4,325,089 | 4/1982 | Hsu | 360/69 |
| 4,562,562 | 12/1985 | Moriya et al. | 369/44 |
| 4,573,087 | 2/1986 | Tezuka et al. | 360/75 |

*Primary Examiner*—Donald McElheny, Jr.
*Attorney, Agent, or Firm*—Wenderoth, Lind & Ponack

[57] ABSTRACT

A recording and reproduction apparatus for recording signals on a recording medium or reproducing signals recorded on the recording medium, which is so arranged that, with acceleration detectors being provided for detecting accelerations of the apparatus by vibrations or impacts applied from outside, signals from the acceleration detectors are applied to control section for stabilization of the control system and also, for proper treatment upon application of excessively large external vibrations or impacts, with consequent improvements of reliability and stability of the apparatus.

19 Claims, 3 Drawing Figures

RECORDING AND REPRODUCTION APPARATUS HAVING IMPROVED RELIABILITY WITH RESPECT TO EXTERNALLY APPLIED VIBRATION OR IMPACT

BACKGROUND OF THE INVENTION

The present invention generally relates to a recording and/or reproduction system and more particularly, to a recording and/or reproduction system for recording signals on a recording medium or reproducing signals recorded on the recording medium.

Conventionally, for the recording and reproduction apparatus of the kind as referred to above, there have been proposed the magnetic type recording and reproduction apparatus, optical-magnetic type recording and reproduction apparatus, optical type recording and reproduction apparatus, optical or capacity type reproduction apparatus, etc., in which the optical type recording and reproduction apparatus will be taken up hereinbelow for explaining the prior art.

As one example of the optical system recording and reproduction apparatus, there may be available an arrangement so arranged that a light beam emitted from a light source such as a semi-conductor laser, etc. is converged to have a very small beam diameter by a conveying lens so as to be projected onto a rotating disc-like recording medium, whereby during recording, the light amount of the light beam is altered according to the signal to be recorded for the recording, while during reproduction, the light beam is adapted to have a weak and constant light amount so as to reproduce the signal through detection of light reflected by or transmitted through the recording medium.

The recording medium to be employed for the apparatus as described so far is, for example, so constructed that a substrate is preliminarily formed, on its surface, with a recording track in a concave and convex configuration, on the surface of which a recording material layer is formed by such means as evaporation or the like. The recording track as described above has a spiral or concentric form, with very small track pitch or interval and track width, and for example, the track interval is about 1.6 μm, while the track width is 0.6 μm or thereabout.

Accordingly, in the optical type recording and reproducing apparatus as described above, it is indispensable to provide a focus control means for controlling the light beam irradiated onto the rotating recording medium, to have a very small beam diameter constant at all times, and a tracking control means for controlling the light beam converged onto the recording medium, to correctly scan on the track at all times for obtaining reproduction signals at high qualities.

The focus control is effected in such a manner that the state of converging of the light beam on the recording medium is detected based on the light beam reflected from the recording medium, and the converging lens is displaced in a direction perpendicular to the surface of the recording medium according to the signal thus detected. For this focus control, an extremely high accuracy, for example, under ±0.5 μm is required.

Meanwhile, the tracking control is so effected that by the light beam transmitted through the recording medium or reflected therefrom, positional deviation between the light beam converged on the recording medium and the track is detected, and according to the signal thus detected, the converging lens is displaced in a radial direction within the surface of the recording medium. In the above tracking control also, an extremely high accuracy, for example, under ±0.1 μm is required in the similar manner as in the focus control.

The range in which the converging lens can be displaced in the radial direction within the recording medium surface is small at about 200 μm or so at the most, and generally, in the tracking control, a transfer control is effected in which the converging lens is displaced for the light beam to follow with respect to eccentricity of the track, and the whole optical system including the light source is displaced in the radial direction of the recording medium so that the displacement of the converging lens becomes zero on the average, i.e., the converging lens moves with respect to the natural state as a center.

The known optical type recording and reproducing apparatus as described so far is required to be controlled at a very high accuracy, and accordingly, is very weak against external vibrations or impacts to be applied to the apparatus on the whole.

By way of example, on the assumption that the acceleration of the external vibrations is 9.8 m/sec$^2$, the entire apparatus is to be displaced as much as ±2.5 mm in the case of a sinusoidal wave at 10 Hz. Accordingly, in order that the apparatus functions at high reliability with respect to external vibrations of the acceleration of 9.8 m/sec$^2$ at 10 Hz, loop gain of 74 dB at 10 Hz from the focus control system and that of 88 dB at 10 Hz for the tracking control system, are at least required. Moreover, high speed response is also required for the transfer control.

However, there are further the vertical deviation acceleration of the recording medium with respect to the focus control, and the radial deviation of the track with respect to the tracking control. Accordingly, the loop gains for the above focus control system and tracking control system are still required more.

In order to constitute the control system having such high gains as described above, it is indispensable to detect the control signal at a high S/N ratio, and to provide a control means with a high performance. In the conventional arrangements, however, since the above conditions are not satisfied, they are not strong enough against vibrations or impacts applied from outside, with a great possibility of track jump, defocusing, etc. For example, if the track jump takes place during recording of a signal, not only the signal itself is not correctly recording, but there are such drawbacks in the worst case that other tracks are damaged or signals already recorded on other tracks are undersirably spoiled, etc. Meanwhile, in the case where track jump takes place during reproduction of already recorded signals, it is needless to say that the expected signal can not be properly reproduced.

As described so far, the conventional apparatuses of this kind are very low in the reliability against vibrations or impacts to be applied from outside.

SUMMARY OF THE INVENTION

Accordingly, an essential object of the present invention is to provide an improved recording and reproduction apparatus which has a high reliability against vibrations or impacts to be externally applied thereto, with substantial elimination of disadvantages inherent in the conventional apparatus of this kind.

Another important object of the present invention is to provide a recording and reproduction apparatus of the above described type, which is simple in construction and stable in functioning, and can be readily manufactured at low cost.

In accomplishing these and other objects, according to one aspect of the present invention, the recording and reproduction apparatus is so arranged that, by providing an acceleration detecting means for detecting the acceleration of vibrations or impacts applied to the apparatus from outside, resistance against vibrations is improved through application of the signal from the acceleration detecting means to a control means.

In another aspect of the present invention, an abnormal state detecting means is provided for detecting that the magnitude of vibrations or impacts applied to the apparatus has exceeded a predetermined value based on the signal of the acceleration detecting means for proper treatment of the apparatus in the case where the signal is emitted from the abnormal state detecting means, with a consequent improvement of the reliability against the external vibrations or impacts.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1:
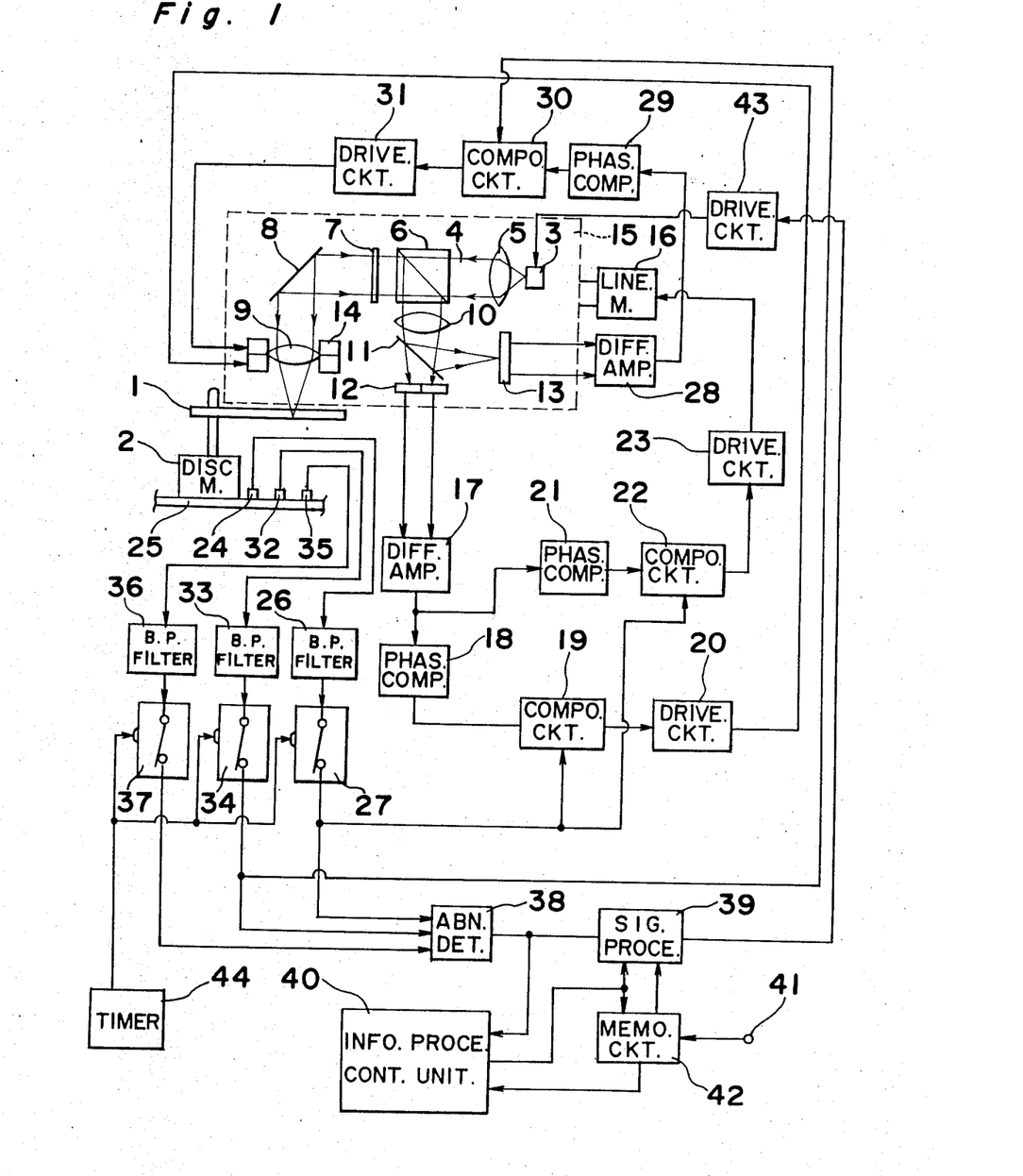
FIG. 1 is a block diagram for explaining the present invention as applied to an optical type recording and reproduction apparatus according to one preferred embodiment thereof.

Referring now to the drawings, there is shown in FIG. 1 a block diagram of an optical type recording and reproduction apparatus to which the present invention has been applied.

In FIG. 1, a recording medium 1 is mounted on a disc motor 2 and rotated at the predetermined number of revolutions. Meanwhile, a light beam 4 emitted from a light source 3 is formed into parallel light rays by a coupling lens 5 provided before the light source 3, and passes through a polarization beam splitter 6 and a ¼ wavelength plate 7 so as to be reflected by a reflecting mirror 8, and thereafter, converged by a converging lens 9 for subsequently being projected onto the recording medium 1. The light beam 4 reflected by the recording medium 1 is again passed through the converging lens 9, reflected by the reflecting mirror 8, passed through the ¼ wavelength plate 7 and is reflected by the polarization beam splitter 6 so as to be incident upon a convex lens 10. The light beam 4 which has transmitted through the convex lens 10 is divided by a dividing mirror 11 as described in more detail later, and part of the light beam 4 is projected onto a photo-detector 12, while the remaining light beam 4 is reflected so as to be projected onto another photo-detector 13. The converging lens 9 is mounted on a movable portion of a control means 14 displaceable in two axis directions, i.e., one direction perpendicular to the plane of the recording medium 1, and the other radial direction of the recording medium 1, and thus, arranged to be movable in said two axis directions by the control means 14. Meanwhile, the light source 3, coupling lens 5, polarization beam splitter 6, ¼ wavelength plate 7, reflecting mirror 8, control means 14, convex lens 10, dividing mirror 11, and photo-detectors 12 and 13 surrounded by a dotted line, are mounted on a transfer table 15 so as to be displaced, in one unit, in the radial direction of the recording medium 1 by a linear motor 16.

Figure 2:
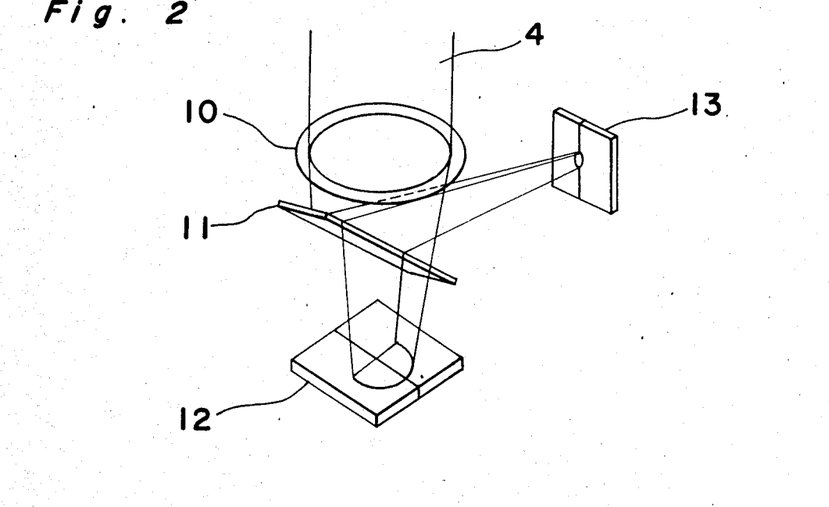
FIG. 2 is a perspective diagram for explaining an arrangement for detecting tracking control signal and focus control signal.

Referring also to FIG. 2, constructions of the converging lens 10, dividing mirror 11, and photo-detectors 12 and 13 will be described hereinbelow. The dividing mirror 11 is constituted by a total reflection mirror, and so disposed that its reflecting surface is inclined at 45° with respect to the optical axis of the light beam 4, and that half of the light beam 4 transmitted through the converging lens 9 is projected onto the reflecting surface thereof. The half of the light beam 4 reflected by the dividing mirror 11 is projected onto the photo-detector 13, while the remaining half of the light beam 4 is projected onto the photo-detector 12. More specifically, the dividing mirror 11 divides the light beam 4 into two portions in the track direction and perpendicular direction, in a plane perpendicular with respect to the optical axis of the light beam 4, and projects half of the light beam 4 onto the photo-detector 13 and the remaining half of the light beam 4 onto the photo-detector 12.

Each of the optical detectors 12 and 13 is further divided into two portions, and has two light receiving regions. The photo-detector 12 is so disposed that the dividing line thereof is directed in the track direction on the light receiving surface of said photo-detector 12, while the photo-detector 13 is so disposed that its dividing line is directed in the direction perpendicular to the track direction on the light receiving surface of the photodetector 12. Since it has been known that the difference of signals between the two light receiving regions of the photo-detector 12 becomes the signal representing the positional deviation of the light beam 4 and track on the recording medium 1, while the difference of signals between the two light receiving regions of the photo-detector 13 provides the signal indicative of the state of converging of the light beam on the recording medium 1, detailed description thereof is abbreviated for brevity.

Referring back to FIG. 1, the two outputs of the photo-detector 12 are respectively applied to a differential amplifier 17, which in turn produces a signal corresponding to the difference of both signals. As stated earlier, the signal of the differential amplifier 17 becomes the signal representing the positional deviation between the light beam 4 and track on the recording medium 1, i.e., the tracking control signal. The signal from the differential amplifier 17 is applied to a tracking terminal of the control means 14 through a phase compensation circuit 18 for compensating for the phase of the tracking control system, a composing circuit 19 and a driving circuit 20 for power amplification.

Accordingly, the control means 14 displaces the converging lens 9 in a radial direction of the recording medium 1 corresponding to the signal of the differential amplifier 17 so that the light beam 4 on the recording medium 1 scans on the track at all times. Meanwhile, the signal of the differential amplifier 17 is also applied, through a phase compensation circuit 21, a composing circuit 22, and a driving circuit 23 for power amplification, to the linear motor 16, which displaces the transfer table 15 so that the displacement in the radial direction of the recording medium 1 by the control means 14 becomes zero on the average (the above control will be referred to as a transfer control hereinbelow). The phase compensation circuit 21 is intended to compensate for the phase of the transfer control system.

On a frame 25 of the apparatus on which the disc motor 2, etc. are supported, there is mounted an acceleration detector 24 for detecting acceleration, and this acceleration detector 24 is adapted to detect acceleration of vibrations or impacts externally applied in a direction perpendicular to the track direction on the recording medium, i.e., in a direction in which the control means 14 is displaced corresponding to the signal of the differential amplifier 17.

Although various kinds of acceleration sensors are available, there is an acceleration sensor arranged to detect the acceleration, for example, by detecting electrical charge produced when a force is applied to a piezoelectric element (this effect is referred to as a piezoelectric effect). The acceleration sensor of this kind can not detect a constant acceleration as the gravitational acceleration, and its capacity is limited to a predetermined frequency range.

The signal from the acceleration detector 24 is fed to the composing circuits 19 and 22 through a band-pass filter 26 passing frequencies, for example, from one Hz to one KHz and a switch 27.

The composing circuit 19 produces a signal in which the signal of the phase compensation circuit 18 and the acceleration detector 24 are composed, while the composing circuit 22 outputs a signal in which the signals of the phase compensation circuit 21 and the acceleration detector 24 are composed. Thus, the control means 14 and the linear motor 16 are driven according to the signal of the acceleration detector 24.

In the case where the entire apparatus is subjected to external vibrations or impacts in the radial direction of the recording medium 1, i.e., in the direction in which the control means 14 is displaced according to the signal of the differential amplifier 17, the recording medium 1 moves in one unit with the frame 25 of the apparatus to correspond to the external vibrations or impacts, but the movable portion of the linear motor 16 including the transfer table 15 is subjected to inertia force. Therefore, if the acceleration applied from outside is detected by the acceleration detector 24, with the signal thereof being applied to the linear motor 16 for offsetting the inertia force, the transfer table 15 is displaced in one unit with the frame 25. Thus, upon application of external vibrations or impacts, when the frame 25 and the transfer table 15 move in one unit, the movable portion of the control means 14 including the converging lens 9 is similarly subjected to inertia force. Accordingly, when the signal of the acceleration detector 24 is applied to the tracking terminal of the control means 14 for offsetting the inertia force, the converging lens 9 is displaced in one unit with the frame 25.

As is seen from the foregoing description, when the signal of the acceleration detector 24 is applied to the tracking terminal of the control means 14 and the linear motor 16, thereby to offset the inertia force, the converging lens 9 and the transfer table 15 are displaced in one unit with the frame 25, and thus, it becomes possible to suppress the track deviation or track skipping as far as practicable, even when external vibrations or impacts are applied.

Still referring to FIG. 1, the focus control to be effected therein will be described hereinbelow.

The two outputs of the photo-detector 13 are respectively applied to a differential amplifier 28, which produces a signal corresponding to the difference between both signals. As described earlier, the signal of the differential amplifier 28 becomes the signal representing the state of converging of the light beam 4 on the recording medium 1, i.e., a focus deviation signal. Said signal of the differential amplifier 28 is being applied to the focus terminal of the control means 14 through a phase compensation circuit 29 for compensating for the phase of the focus control system, a composing circuit 30, and a driving circuit 31 for power amplification. Accordingly, the control means 14 displaces the converging lens 9 in the direction perpendicular to the surface of the recording medium 1 corresponding to the signal of the differential amplifier 28 so that the state of converging of the light beam 4 on the recording medium 1 becomes constant at all times.

Also mounted on the frame 25 is an acceleration detector 32, which is adapted to detect the acceleration of external vibrations and impacts in the direction perpendicular to the surface of the recording medium 1. The signal of the acceleration detector 32 is fed to the composing circuit 30 through a band-pass filter 33 and a switch 34. The composing circuit 30 produces a signal in which the signals of the phase compensation circuit 29 and the acceleration detector 32 are composed. Accordingly, the control means 14 is driven in a direction perpendicular to the surface of the recording medium 1 corresponding to the signal of the acceleration detector 32.

In the case where the entire apparatus is subjected to external vibrations or impacts in the direction perpendicular to the surface of the recording medium 1, the recording medium 1 moves in one unit with the frame 25 of the apparatus to correspond to the external vibrations or impacts, but the movable portion of the control means 14 including the converging lens 9 is subjected to inertia force. Therefore, if the acceleration applied from outside is detected by the acceleration detector 32, with the signal thereof being applied to the focus terminal of the control means 14 for offsetting the inertia force, the converging lens 9 is displaced in one unit with the frame 25. Thus, even upon application of external vibrations or impacts, the focus deviation may be reduced to the minimum.

So far, although a further improvement on the accuracy for the focus control and tracking control through detection of acceleration of externally applied vibrations or impacts by the acceleration detectors 24 and 32 has been described, there are still possibilities that track deviation, focus deviation or track skipping and the like may take place if large vibrations or impacts are applied.

Needless to say, there is a limitation to the output acceleration of the control means 14 and the linear motor 16, and it vibrations or impacts exceeding such limitation should be applied, the track skipping or focus deviation takes place.

Moreover, it is very difficult to construct the frame 25, disk motor 2, recording medium, etc. so as to be completely rigid bodies, and thus, it is impossible to perfectly offset the vibrations or impacts externally applied, thus giving rise to the track deviation or focus deviation in some cases. Furthermore, even when external vibrations or impacts are applied, for example, in the direction perpendicular to the surface of the recording medium 1, vibrations take place in all directions, since the frame 25 is not a perfectly rigid body.

On the other hand, if external vibrations or impacts are applied in the track direction of the recording medium 1, i.e., in the direction generally perpendicular to the displacing direction of the transfer table 15, the control means 14 vibrates in the track direction of the recording medium 1, thus resulting in variation of time axis.

As described so far, when large vibrations or impacts are applied from outside, the reliability of the apparatus is remarkably lowered, and it becomes impossible to guarantee the quality of the signal being recorded or reproduced. Especially, when the signal is being recorded, there is a possibility that other tracks are damaged or signals already recorded on other tracks are undesirably spoiled.

According to the present invention, in order to prevent such worst condition as above from taking place, it is so arranged that the recording is suspended or inhibited when vibrations or impacts exceeding the predetermined value are applied to the apparatus.

Further mounted on the frame 25 is another acceleration detector 35 which is coupled to a switch 37 through a band-pass filter 36 and arranged to detect the acceleration of vibrations and impacts applied in the track direction on the recording medium 1.

The signals of the acceleration detectors 24, 32 and 35 are respectively applied to an abnormal state detecting circuit 38 through the band-pass filters 26, 33 and 36, and the switches 27, 34 and 37.

The abnormal state detecting circuit 38 to be described in more detail later is arranged to feed to a signal processing circuit 39 and information processing and control unit 40, a signal informing that excessively large vibrations or impacts are applied, in the case where any one of the signals of the acceleration detectors 24, 32 and 35 exceeds the predetermined value. Meanwhile, the information processing and control unit 40 for controlling the whole apparatus is arranged to inhibit the recording, and notify the abnormal state to other related appliances, while making a self-diagnosis as to whether or not troubles such as the focus deviation, track skipping, etc. are taking place.

Hereinbelow, description will be given on the recording of signals by the arrangement as explained so far.

The signal to be recorded is externally applied to a memory circuit 42 through an input terminal 41. The memory circuit 42 stores therein the input signal and thereafter, sends a signal informing that the recording signal has been received, to the information processing and control unit 40, which ensures that the light beam 4 on the recording medium 1 is located on the predetermined track, with the recording medium 1 arriving at the recording position, and feeds a signal for enabling a recording gate, e.g., "High" signal to the signal processing circuit 39 and memory circuit 42. This memory circuit 42 is adapted to successively feed the stored signal to the signal processing circuit 39, which in turn applies a signal to a driving circuit 43 for modulation of the light source 3 according to the signal fed from the memory circuit 42. The driving circuit 43 modulates the light beam 4 to have a high or low intensity, and the recording medium 1 is altered in its form by heat of the light beam 4.

If excessively large vibrations or impacts are applied during the recording of signals, the abnormal state detecting circuit 38 feeds the signal informing such condition to the signal processing circuit 39 and the information processing and control unit 40, and said signal processing circuit 39 immediately suspends the signal being fed to the driving circuit 43, and thus, the light source 3 produces a small light amount for the reproducing period. The information processing and control unit 40 recognizes the interruption of the recording, and notifies the state to the external appliances, and also, controls the apparatus for fresh recording at designated places, according to the instructions of the external appliances.

Subsequently, the reason for providing the switches 27, 34 and 37 in the apparatus of the present invention will be explained.

As described earlier, the acceleration sensor employing a piezoclectric element is unable to detect a constant acceleration such as the gravitational acceleration, etc., while the recording and reproduction apparatus to which the present invention is applied is generally placed on a desk or the like in many cases, and is seldom subjected to excessively large vibrations or impacts at extremely low frequencies. Accordingly, it is desirable to limit the passing band region for the signals of the acceleration detectors 24, 32 and 35 by the band-pass filters 26, 33 and 36. However, when the power source of the apparatus is turned on, transient signals are produced at the outputs of the band-pass filters 26, 33 and 36. If the above transient signals are fed to the control means 14, linear motor 16 or abnormal state detecting circuits 38, the apparatus is damaged or subjected to malfunctions. Therefore, the switches 27, 34 and 37 are provided to prevent the transient signals of the band-pass filters 26, 33 and 36 from being transmitted to the control means 14, linear motor 16, and abnormal state detecting circuit 38.

A timer 44 is coupled to the switches 27, 34 and 37 so as to feed signals for short-circuiting said switches 27, 34 and 37 after a predetermined period of time subsequent to the turning on of the power supply, respectively to input terminals thereof to open or close said switches. Accordingly, since the signals of the band-pass filters 26, 33 and 36 are respectively fed to the control means 14, linear motor 16, and abnormal state detecting circuit 38 after the predetermined period of time subsequent to the turning on of the power source, there is no possibility that the apparatus is subjected to damages or to erroneous functions by the transient signals upon turning on of the power source.

Figure 3:
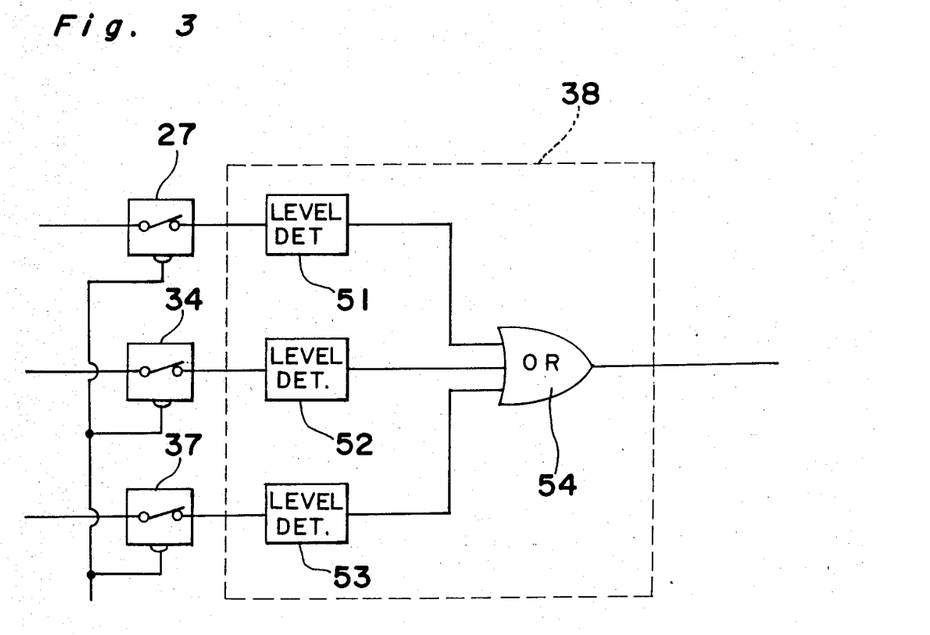
FIG. 3 is a block diagram for an abnormal state detecting circuit employed in the recording and reproduction apparatus according to the present invention.

Referring further to FIG. 3, the abnormal state detecting circuit 38 will be described in detail hereinbelow.

The abnormal state detecting circuit 38 surrounded by dotted lines, includes level detecting circuits 51, 52 and 53 connected at the input sides thereof to the switches 27, 34 and 37, and at the output sides thereof to an OR circuit 54 respectively. The signals from the switches 27, 34 and 37 are respectively applied to the level detecting circuits 51, 52 and 53, while the signals of said level detecting circuits are input to the OR circuit 54. The level detecting circuits 51, 52 and 53 are arranged to output "High" signals when amplitudes of the signals from the acceleration detecting circuits 24, 32 and 35 exceed predetermined values. By way of example, when the output signals of the acceleration detectors 24, 32 and 35 are respectively represented by symbols a1, a2 and a3, with the detecting levels of the level detecting circuits 51, 52 and 53 being respectively denoted by symbols V1, V2 and V3 (which are to be positive real numbers), the level detecting circuit 51 outputs "High" signal when the relation is a1 < −V1 or a1 > V1, and the level detecting circuit 52 emits "High" signal when the relation is a2 < −V2 or a2 > V2, while the level detecting circuit 53 outputs "High" signal when the relation is a3 < −V3 or a3 > V3. It is to be noted that the polarities of a1, a2 and a3 represent directions of the acceleration.

With respect to the values of the detecting level V1, V2 and V3 of the level detecting circuits 51, 52 and 53, it is necessary that resistances against vibrations and impacts of the apparatus are taken into consideration. More specifically, resistances against vibrations and impacts of the apparatus are different according to directions, and generally lower in the tracking control system than in the focus control system, mainly owing to the difference between the tracking control accuracy (lower than ±1 μm) and the focus control accuracy (lower than ±0.1 μm).

The OR circuit 54 produces outputs corresponding to the logical sum of the level detecting circuits 51, 52 and 53, and if any one of the leve detecting circuits 51, 52 and 53 emits "High" signal, the OR circuit 54 produces "High" signal which is fed to the signal processing circuit 39 and the information processing and control circuit 40 referred to earlier with reference to FIG. 1.

It should be noted here that the present invention is not limited in its application to the foregoing embodiment alone, but may be modified in various ways within the scope. For example, in an optical type sound reproduction apparatus for reproducing a recording medium on which sound, voice, etc. are recorded, it may be so arranged as to cut off the sound signal to prevent occurrence of noises, when excessively large vibrations or impacts are applied thereto. Similarly, in an apparatus for reproducing a recording medium recorded with data, etc., the arrangement may be so made that, when excessively large vibrations or impacts are applied, it is regarded that an abnormal state has occurred, and the desired signal is again reproduced after stabilization of the state.

Moreover, it may be so modified that the track skipping is detected by the signal of the level detecting circuit 51 for proper remedy of the defect, or that, when the signal is produced from the level detecting circuit 52, this is regarded as the deviation of the focus control so as to cause the focus control to function again.

In the embodiment of FIG. 1, although the control means 14 is of the two axis construction, there has been known a control means of a three axis construction in an optical type video reproduction apparatus for reproducing images or the like. More specifically, such control means is arranged to be displaceable in three axis directions, i.e., in the direction perpendicular to the surface of the recording medium, track direction on the recording medium, and direction perpendicular to the track direction on the recording medium. The arrangement as referred to above is required, since in the optical type video reproduction apparatus, it is necessary to correct the variation of the time axis resulting from eccentricity, etc. in the recording medium.

In the general time axis correcting control, the phase of a synchronizing signal contained in a reproduction signal and that of a reference signal are compared with each other to obtain a signal corresponding to a phase difference between both signals, and this signal corresponding to the phase difference is applied to the terminal for the time axis control of the control means, thereby controlling the light beam on the recording medium to move in the track direction so that the phase of the synchronizing signal contained in the reproduction signal is maintained at a predetermined relation with respect to the phase of the reference signal.

It is needless to say that, in the apparatus which effects the time axis correction control as described above, if the arrangement is so made that the signal of the acceleration detector 35 is applied to the time axis control terminal of the control means, the time axis variation may be reduced as far as possible, even when external vibrations or impacts are applied thereto.

As is clear from the following description, if the present invention is applied, the recording and reproduction apparatus strong against external vibrations or impacts may be advantageously provided, with a consequent marked improvement of the reliability.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A recording and reproduction apparatus which comprises a converting means for recording signals on a recording medium or reproducing signals recorded on the recording medium, a displacing means for relatively displacing scanning position of said converting means in a direction generally perpendicular with respect to track direction on the recording medium, a track deviation detecting means for detecting the positional deviation between the track on the recording medium and the scanning position of said converting means, a control means for controlling so that the scanning position of said converting means scans on the track on said recording medium at all times by displacing said displacing means according to the signal of said track deviation detecting means, and an acceleration detecting means for detecting acceleration of vibrations or impacts applied to said apparatus in the displacing direction of said displacing means, the signal of said acceleration detecting means being arranged to be applied to said displacing means.

2. A recording and reproduction apparatus as claimed in claim 1, further arranged to input the signal of said acceleration detecting means to said displacing means after a predetermined period of time subsequent to turning on of a power source of said apparatus.

3. A recording and reproduction apparatus which comprises a converting means for recording signals on a recording medium or reproducing signals recorded on the recording medium, a first displacing means for relatively displacing scanning position of said converting means in a direction generally perpendicular with respect to track direction on the recording medium, a second displacing means for relatively displacing scanning position of said converting means in a direction on the recording medium including said first displacing means, a track deviation detecting means for detecting the positional deviation between the track on the recording medium and the scanning position of said converting means, a first control means for controlling so that the scanning position of said converting means scans on the track on said recording medium at all times by displacing said first displacing means according to the signal of said track deviation detecting means, a second control means for controlling by displacing said second displacing means so that said first displacing means is displaced with respect to natural state as a center during functioning of said first control means, and an acceleration detecting means for detecting acceleration of vibrations or impacts applied to said apparatus in the displacing direction of said second displacig means, the signal of said acceleration detecting means being arranged to be applied to said second displacing means.

4. A recording and reproduction apparatus as claimed in claim 3, further arranged to input the signal of said acceleration detecting means to said second displacing means after a predetermined period of time subsequent to turning on of a power source of said apparatus.

5. A recording and reproduction apparatus as claimed in claim 4, wherein the signal of said acceleration detecting means is arranged to be also applied to said first displacing means.

6. A recording and reproduction apparatus as claimed in claim 5, further arranged to input the signal of said acceleration detecing means to said first displacing means after a predetermined period of time subsequent to turning on of a power source of said apparatus.

7. A recording and reproduction apparatus which comprises a converging means for converging a light beam produced from a light source so as to be projected onto a recording medium, a converging state detecting means for detecting the state of converging of the light beam on the recording medium, a displacing means for displacing said converging means in a direction generally perpendicular with respect to the surface of said recording medium, a control means for displacing said displacing means according to the signal of said converging state detecting means so as to control so that the converging state of the light beam on the recording medium becomes constant at all times, and an acceleration detecting means for detecting acceleration of vibrations or impacts applied to said apparatus in a direction generally perpendicular to the surface of said recording medium, the signal of said acceleration detecting means being arranged to be applied to said displacing means.

8. A recording and reproduction apparatus as claimed in claim 7, further arranged to input the signal of said acceleration detecting means to said displacing means after a predetermined period of time subsequent to turning on of a power source of said apparatus.

9. A recording and reproduction apparatus which comprises a converting means for recording signals on a recording medium or reproducing signals recorded on the recording medium, a displacing means for displacing scanning position of said converting means in a track direction on the recording medium, a synchronizing signal separating means for separating the synchronizing signal from the signal reproduced from said converting means, a reference signal generating means for generating reference signal, a phase comparing means for comparing phases of the signal of said synchronizing signal separating means and the signal of said reference signal generating means so as to output signal corresponding to a phase difference of both signals, a control means which drives said displacing means according to the signal of said phase comparing means for controlling so that the signal of said synchronizing signal separating means is held in a predetermined phase relation with respect to the signal of said reference signal generating means, and an acceleration detecting means for detecting acceleration of vibrations or impacts applied to said apparatus in the displacing direction of said displacing means, the signal of said acceleration detecting means being arranged to be applied to said displacing means.

10. A recording and reproduction apparatus as claimed in claim 9, further arranged to input the signal of said acceleration detecting means to said displacing means after a predetermined period of time subsequent to turning on of a power source of said apparatus.

11. A recording and reproduction apparatus which includes means such that a light beam which converged and projected onto a recording medium is displaceable in a direction parallel to a surface of the recording medium and perpendicular to a track thereon so as to record signals on the track or to reproduce signals recorded on the recording medium, said recording and reproduction apparatus comprising an acceleration detecting means for detecting acceleration of the apparatus due to vibrations or impacts externally applied thereto and for supplying an output signal corresponding thereto, an abnormal state detecting means for detecting that a magnitude of the vibrations or impacts applied to the apparatus has exceeded a predetermined value based on said output signal from said acceleration detecting means and for supplying an output signal corresponding thereto, and a means for inhibiting recording in accordance with said output signal from said abnormal state detecting means.

12. A recording and reproduction apparatus as claimed in claim 11, wherein said acceleration detecting means detects acceleration in a direction parallel to the surface of the recording medium and perpendicular to the track thereon.

13. A recording and reproduction apparatus as claimed in claim 11, wherein said abnormal state detecting means is enabled so as to operate only after a predetermined period of time subsequent to a turning on of a power source of the apparatus.

14. A recording and reproduction apparatus which includes means such that a light beam converged and projected onto a recording medium is displaceable in a direction parallel to a surface of the recording medium and perpendicular to a track thereon so as to record signals on the track or to reproduce signals recorded on the recording medium, said recording and reproduction apparatus comprising an acceleration detecting means for detecting acceleration of the apparatus due to vibrations or impacts externally applied thereto and for supplying an output signal corresponding thereto, an abnormal state detecting means for detecting that magnitude of the vibrations or impacts applied to the apparatus has exceeded a predetermined value based on said output signal from said acceleration detecting means and for supplying an output signal corresponding thereto, and a means for stopping recording in accordance with said output signal from said abnormal state detecting means during recording of the signal to be recorded.

15. A recording and reproduction apparatus as claimed in claim 14, wherein said acceleration detecting means detects acceleration in a direction parallel to the surface of the recording medium and perpendicular to the track thereon.

16. A recording and reproduction apparatus as claimed in claim 14, wherein said abnormal state detecting means is enabled so as to operate only after a predetermined period of time subsequent to a turning on of a power source of the apparatus.

17. A recording and reproduction apparatus which includes means such that a light beam converged and projected onto a recording medium is displaceable in a direction parallel to a surface of the recording medium and perpendicular to a track thereon so as to record signals on the track or to reproduce signals recorded on the recording medium, said recording and reproduction apparatus comprising an acceleration detecting means for detecting acceleration of the apparatus due to vibrations or impacts externally applied thereto and for supplying an output signal corresponding thereto, an abnormal state detecting means for detecting that a magnitude of the vibrations or impacts applied to the apparatus has exceeded a predetermined value based on said output signal from said acceleration detecting means and for supplying an output signal corresponding thereto, and a means for stopping outputting of a reproduction signal in accordance with said output signal from said abnormal state detecting means.

18. A recording and reproduction apparatus as claimed in claim 17, wherein said acceleration detecting means detects acceleration in a direction parallel to the surface of the recording medium and perpendicular to the track thereon.

19. A recording and reproduction apparatus as claimed in claim 17, wherein said abnormal state detecting means is enabled so as to operate only after a predetermined period of time subsequent to a turning on of a power source of the apparatus.

* * * * *

REEXAMINATION CERTIFICATE (898th)
United States Patent [19]
Moriya et al.

[11] B1 4,692,915
[45] Certificate Issued Jul. 19, 1988

[54] RECORDING AND REPRODUCTION APPARATUS HAVING IMPROVED RELIABILITY WITH RESPECT TO EXTERNALLY APPLIED VIBRATION OR IMPACT

[75] Inventors: Mitsuro Moriya, Neyagawa; Kazuharu Shiragami; Hiroyuki Yamaguchi, both of Hirakata, all of Japan

[73] Assignee: Matsushita Electric Industrial Co., Ltd., Kadoma, Japan

Reexamination Request:
No. 90/001,399, Dec. 18, 1987

Reexamination Certificate for:
Patent No.: 4,692,915
Issued: Sep. 8, 1987
Appl. No.: 738,464
Filed: May 28, 1985

[30] Foreign Application Priority Data
Jun. 15, 1984 [JP] Japan .................. 59-123000

[51] Int. Cl.$^4$ ............................................. G11B 27/36
[52] U.S. Cl. ......................................... 369/53; 369/45; 369/46; 369/54; 369/58
[58] Field of Search ..................... 369/43–46, 369/53, 54, 58, 247, 263, 116; 358/342; 360/39, 69, 71, 75, 77, 78; 346/76 L; 250/201, 205

[56] References Cited
U.S. PATENT DOCUMENTS

| | | | |
|---|---|---|---|
| 4,475,182 | 10/1984 | Hosaka | 369/45 |
| 4,486,791 | 12/1984 | Wada et al. | |
| 4,587,644 | 5/1986 | Fujiie | 369/44 |
| 4,608,680 | 8/1986 | Yano | 369/44 |
| 4,614,863 | 9/1986 | Sato | 369/44 |
| 4,669,072 | 5/1987 | Miura et al. | 369/44 |
| 4,684,797 | 8/1987 | Ando et al. | 250/201 |
| 4,703,468 | 10/1987 | Baba et al. | 369/44 |

FOREIGN PATENT DOCUMENTS

60-35377 2/1985 Japan .
60-55523 3/1985
60-95733 5/1985
7902376 10/1979 Netherlands .

*Primary Examiner*—Donald McElheny, Jr.

[57] ABSTRACT

A recording and reproduction apparatus for recording signals on a recording medium or reproducing signals recorded on the recording medium, which is so arranged that, with acceleration detectors being provided for detecting accelerations of the apparatus by vibrations or impacts applied from outside, signals from the acceleration detectors are applied to control section for stabilization of the control system and also, for proper treatment upon application of excessively large external vibrations or impacts, with consequent improvements of reliability and stability of the apparatus.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 7-19 is confirmed.

Claims 1 and 3 are determined to be patentable as amended.

Claims 2 and 4-6, dependent on an amended claim, are determined to be patentable.

1. A recording and reproduction apparatus which comprises a converting means for recording signals on a recording medium or reproducing signals recorded on the recording medium, a displacing means for relatively displacing scanning position of said converting means in a direction generally perpendicular with respect to track direction on the recording medium, a track deviation detecting means for detecting the positional deviation between the track on the recording medium and the scanning position of said converting means, a control means for controlling so that the scanning position of said converting means scans on the track on said recording medium at all times by displacing said displacing means according to the signal of said track deviation detecting means; and an acceleration detecting means for detecting acceleration of vibrations or impacts applied to said apparatus in the displacing direction of said displacing means, the signal of said acceleration detecting means being arranged to be applied to said displacing means [.] *and for outputting a signal corresponding thereto, and a high-pass filter means which prevents a low band region component of said signal output from said acceleration detecting means from passing therethrough, the signal of said acceleration detecting means being supplied to said displacing means through said high-pass filter means.*

3. A recording and reproduction apparatus which comprises a converting means for recording signals on a recording medium or reproducing signals recorded on the recording medium, a first displacing means for relatively displacing scanning position of said converting means in a direction generally perpendicular with respect to track direction on the recording medium, a second displacing means for relatively displacing scanning position of said converting means in a direction on the recording medium including said first displacing means, a track deviation detecting means for detecting the positional deviation between the track on the recording medium and the scanning position of said converting means, a first control means for controlling so that the scanning position of said converting means scans on the track on said recording medium at all times by displacing said first displacing means according to the signal of said track deviation detecting means, a second control means for controlling by displacing said second displacing means so that said first displacing means is displaced with respect to natural state as a center during functioning of said first control means, and an acceleration detecting means for detecting acceleration of vibrations or impacts applied to said apparatus in the displacing direction of said second [displacig] *displacing* means, the signal of said acceleration detecting means being arranged to be applied to said second displacing means.

* * * * *